United States Patent
Bettin (10) Patent No.: US 6,318,477 B1
(45) Date of Patent: Nov. 20, 2001

(54) TOOLBAR WING LIFT CONTROL

(75) Inventor: Leonard A. Bettin, LaGrange Park, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/500,862

(22) Filed: Feb. 9, 2000

(51) Int. Cl.$^7$ .................................................. A01B 63/00
(52) U.S. Cl. ............................................................. 172/452
(58) Field of Search ................................. 172/310, 311, 172/452, 459, 463, 464, 465, 776; 92/61, 62, 75; 91/468, 446, 451, 452; 111/59, 62, 22, 25

(56) References Cited

U.S. PATENT DOCUMENTS

| | | | |
|---|---|---|---|
| 4,074,766 | 2/1978 | Orthman | 172/311 |
| 4,328,869 | 5/1982 | Perelli | 172/311 |
| 4,479,554 | 10/1984 | Kueker | 172/311 |
| 4,512,414 | * 4/1985 | Kuhn et al. | 172/112 |
| 4,570,722 | 2/1986 | Osborn | 172/311 |
| 4,700,784 | 10/1987 | Wiebe et al. | 172/126 |
| 4,790,389 | 12/1988 | Adee et al. | 172/776 |
| 4,825,958 | 5/1989 | Kelderman | 172/413 |
| 4,840,233 | 6/1989 | Friggstad et al. | 172/311 |
| 4,878,545 | 11/1989 | Dyken | 172/776 |
| 4,977,964 | 12/1990 | Friggstad et al. | 172/310 |
| 5,042,589 | 8/1991 | Hundeby et al. | 172/462 |
| 5,065,681 | * 11/1991 | Hadley | 111/55 |
| 5,303,779 | 4/1994 | Friggstad | 172/311 |
| 5,687,798 | * 11/1997 | Henry et al. | 172/311 |
| 5,765,650 | * 6/1998 | Checkel | 172/681 |
| 6,035,943 | * 3/2000 | Gerein et al. | 172/328 |
| 6,044,916 | * 4/2000 | Hundeby | 172/448 |
| 6,068,063 | * 5/2000 | Mayerle et al. | 172/315 |

* cited by examiner

Primary Examiner—Victor Batson (57) ABSTRACT

An agricultural implement has a central section and wing sections with ground engaging tools. A hydraulic cylinder is disposed between the wings and the central frame to raise and lower the wings with respect to the central section. A hydraulic control circuit is coupled to the cylinder to provide a constant downforce to the wings over a range of pivotal ground working positions and to lift the wings above the ground to a non-ground engaging position thereby permitting the implement to be easily turned in the headlands of an agricultural field. When the lifting circuit is engaged, the downforce can be automatically removed from the wing sections permitting them to be raised more easily. The raising and lowering of the central section and wings can be staged, such that the central section is lowered first to prevent damage to ground engaging tools on the wing sections.

21 Claims, 6 Drawing Sheets

TOOLBAR WING LIFT CONTROL

FIELD OF THE INVENTION

The invention relates generally to agricultural vehicles and implements. More particularly, it relates to agricultural implements having wings pivoted to a frame. Still more particularly, it relates to control systems for controlling the pivotal motion of those wings.

BACKGROUND OF THE INVENTION

Agricultural implements that engage the ground, such as planters, harrows and rakes, are often formed in several laterally disposed sections. These sections are pivotally connected to each other for several reasons. First, and due to the great width of the implement, they cannot be pulled along a road without blocking several lanes of traffic unless they can be folded. Second, and also due to their great width, they cannot follow the ground contours of the field unless some vertical pivoting about a longitudinal axis of each section with respect to its adjacent sections is provided.

Implements formed as a series of laterally disposed, pivotally coupled sections suffer from several problems. First, they are difficult to turn. When traveling on the road, turning is not a serious problem since the wings can be completely pivoted to a position above a center section having a center frame, and the center frame can be supported on two or more support wheels. This arrangement permits easy turning. This folding process takes a great deal of time and thus is impractical to perform when turning at the end of each row in the field. At the end of the day, when the farmer has finished working a field, he can engage hydraulic cylinders that gradually lift the wings into this folded position. This may require releasing or engaging various linkages, making or breaking certain hydraulic connections, and emptying certain of the ground engaging tools on the wings that contain fertilizer, herbicides or seed. In short, converting the vehicle into an easy turning roadable configuration takes many minutes and may require the farmer to leave the cab of the vehicle. In a field of 200 acres, for example, the farmer may have to spend more time turning the vehicle at the ends of rows than he would spend actually working the ground.

A partial solution to the problem of difficult turning is to raise the wings about their pivot points, but only slightly. Typically, the hydraulic cylinders that raise the wings are engaged for a limited amount of time to lift the wings only slightly above the ground. This process can be performed in a matter of a few seconds and does not require the farmer to leave the vehicle. It also does not require the time consuming mechanical and hydraulic manual manipulations of the implement.

A second problem that implements with wings have is difficulty in properly distributing the weight of the implement equally over all the ground contacting tools. The center section of the implement typically includes a variety of additional components such as wheels, hydraulic motors, cylinders, bins, hoppers and towing tongue that are not found on the wing sections. A greater downwardly disposed force is applied by the collective weight of these components to each of the ground engaging tools supported on the center section than to those supported by the wings. As a result, the ground engaging tools supported on the center frame penetrate the ground to a greater extent. The center frame also applies a downwardly disposed force to the pivoted inner ends of the wings that it is connected to. This tends to force the inner ends of the wings downward and tends to allow a resistance of the soil to being penetrated to lift the outer, free, ends of the wings upward. The end result of this weight imbalance, then, is to prevent all the ground engaging tools on the center frame and on the wings from penetrating the ground to an equal depth.

One solution that has been proposed to this weight imbalance or "down pressure" problem is to add springs to the implement coupled between the center frame and the wings that are biased to pull the wings downward with respect to the center frame. In this manner, some of the weight of the center frame will be transferred to the wings and the ground engaging tools on the center frame and the on wings will tend to have a more nearly equal weight distribution.

Providing an implement having spring-based down pressure biasing of implement wings with hydraulic cylinders used to lift the wings slightly during turns in the field is difficult, and requires a complicated arrangement of linkages, cylinders and springs.

It would be beneficial, therefore, to provide an improved agricultural vehicle and implement arrangement with a wing lift and down pressure control. It is an object of this invention to provide such a improved system.

SUMMARY OF THE PRESENT INVENTION

In accordance with the first embodiment of the invention an agricultural implement configured to be towed by an agricultural vehicle is provided having a first frame with a plurality of spaced apart ground engaging tools, a second frame with a second plurality of spaced apart ground engaging tools that is pivotally coupled to the first frame, a first hydraulic cylinder coupled between the first frame and the second frame to pivot the first frame with respect to the second frame about a substantially horizontal axis, and a hydraulic control circuit fluidly coupled to the first hydraulic cylinder and including the pressure regulating valve configured to provide a supply of hydraulic fluid under substantially constant pressure to a first port of the first hydraulic cylinder over a range of pivotal positions of the first frame with respect to the second frame. The implement may also include a hydraulic pump configured to be driven by the agricultural vehicle and fluidly coupled to the pressure regulating valve to supply fluid to the first port of the first hydraulic cylinder at a substantially constant pressure. The hydraulic cylinder may have a first piston and a first piston rod coupled to that piston that extends out of the hydraulic cylinder, the piston and piston rod being movable to a fully extended position, a fully retracted position and an intermediate position between those two positions. The fully extended position defines a first frame raised position which the first frame is pivoted above the second frame. The fully retracted position defines the first frame lowered position in which the first frame is pivoted below the second frame and the intermediate position defines an intermediate frame position in which the first frame is pivoted above the second frame between the first raised and second lowered positions. A first hydraulic fluid port is provided in the hydraulic cylinder to lower the first frame when it is filled with hydraulic fluid. The hydraulic cylinder further has a second piston, and a second hydraulic fluid port that is disposed in the cylinder to raise the first frame when the second port is filled with fluid. This happens by driving the second piston toward the first piston a distance that is sufficient to engage the first piston and drive the first piston to the intermediate position. The hydraulic control circuit may include a first check valve located between the pump and the pressure regulating valve that responds to pressure applied to the second port thereby checking hydraulic fluid flow travelling from the pump to the pressure regulating valve. The hydraulic control circuit valve itself may include a hydraulic reservoir disposed on the implement to supply fluid to an inlet of the hydraulic pump and a second check valve located in the hydraulic line extending between the first port and the hydraulic reservoir to check hydraulic fluid flow from the first port to the reservoir through that line. In operation, increasing the hydraulic pressure applied to the second port preferably opens the second check valve and thereby permits the flow of hydraulic fluid from the first port to the reservoir. This increasing hydraulic pressure may also close the first check valve. The hydraulic control circuit may also have another hydraulic supply line that can be coupled to a hydraulic pump on the vehicle to supply hydraulic fluid under pressure to the second port.

Other principal features and advantages of the invention will become apparent to those skilled in the art upon review of the following drawings, the detailed description and the appended claims.

BRIEF DESCRIPTION OF THE DRAWINGS

FIG. 4A illustrates the left cylinder in a completely extended position in which the wing is elevated as high as possible, during normal operation;

FIG. 4B illustrates a middle cylinder position in which the wing is perfectly straight with respect to the main section during normal operation;

FIG. 4C illustrates a completely retracted position in which the wing is lowered as low as possible during normal operation; and FIG. 4D illustrates an intermediate position in which the floating piston has driven the cylinder to a transport position with the wings lifted above the main section;

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF PREFERRED EMBODIMENTS

Before explaining at least one embodiment of the invention in detail it is to be understood that the invention is not limited in its application to the details of construction and the arrangement of the components set forth in the following description or illustrated in the drawings. The invention is capable of other embodiments and of being practiced or carried out in various ways. Furthermore, it is to be understood that the phraseology and terminology employed herein is for the purpose of description and should not be regarded as limiting.

Figure 1:
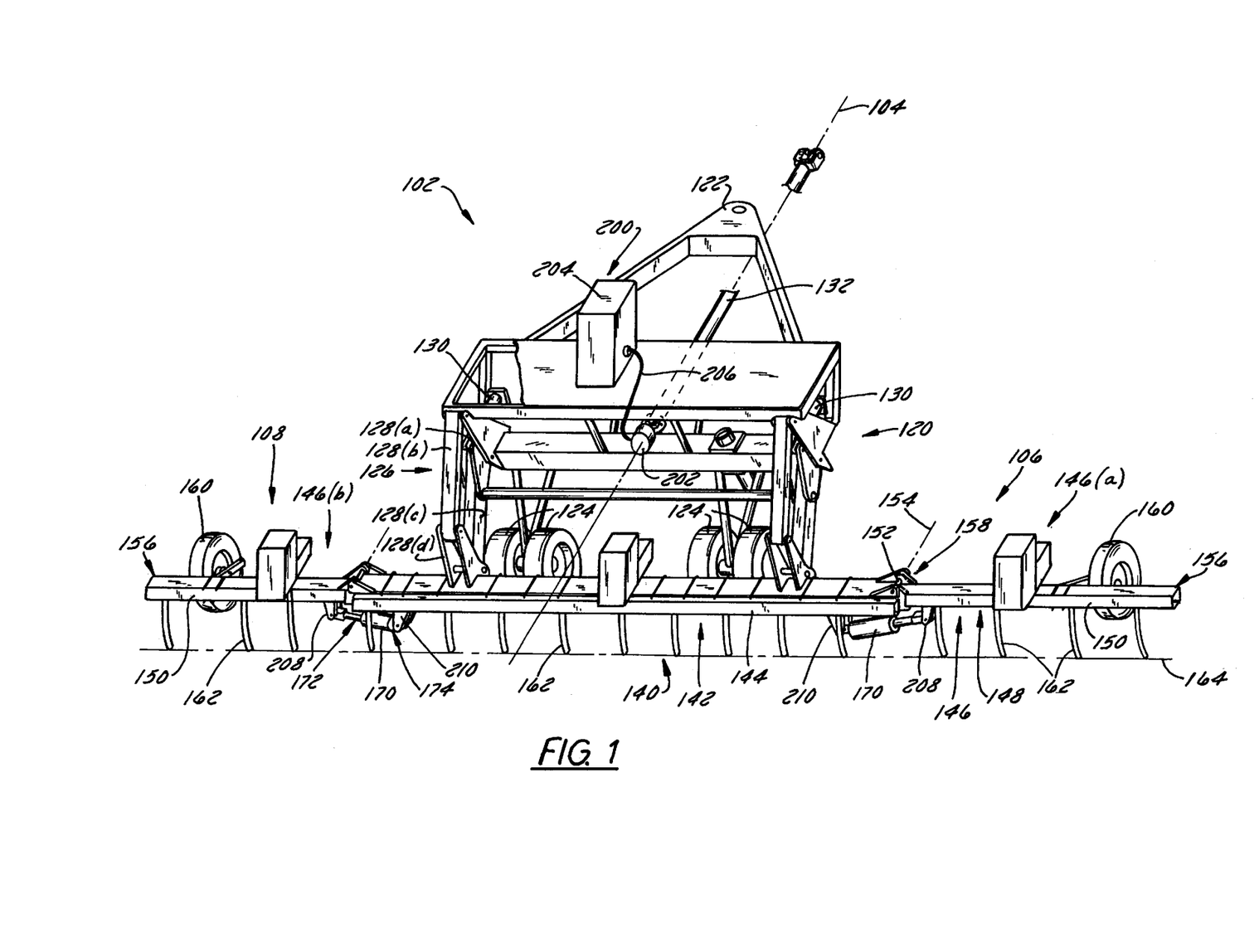
FIG. 1 is a broken-away perspective of an implement including a preferred embodiment of the improved toolbar wing lift control.
Figure 2:
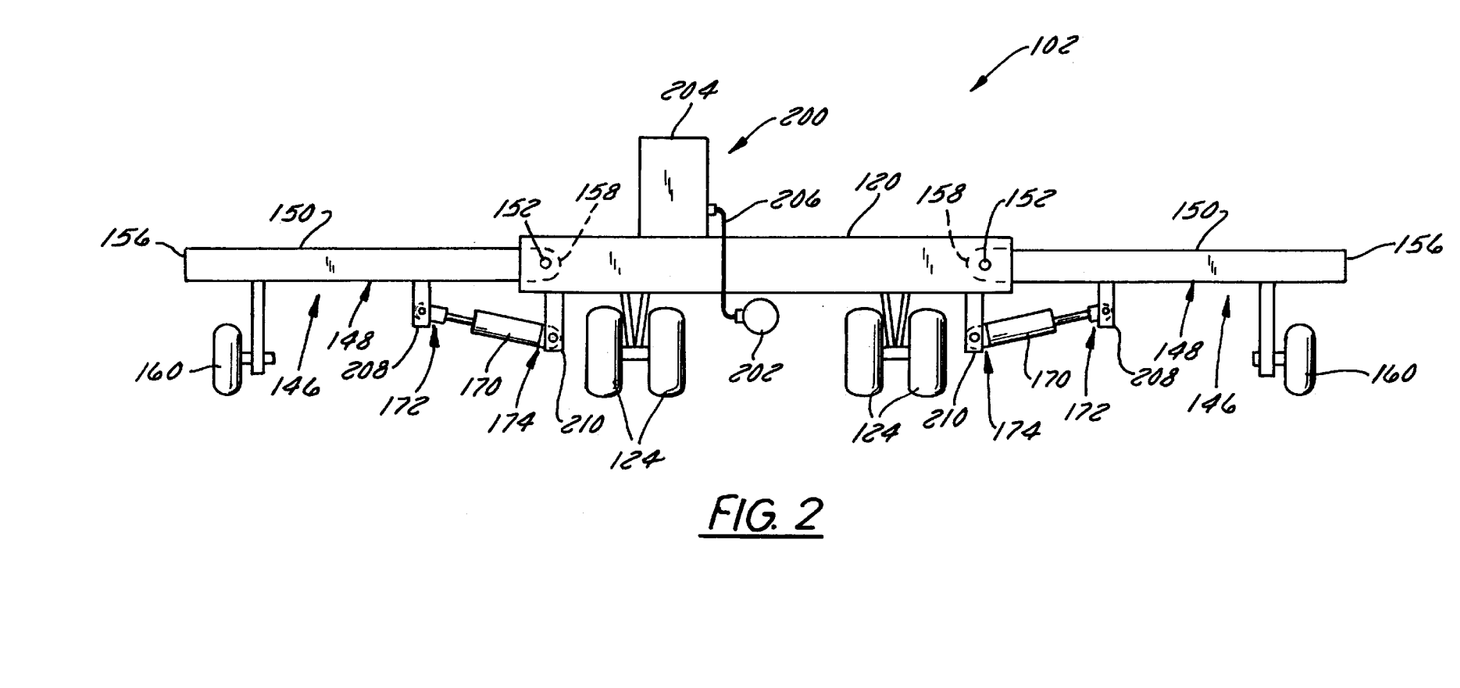
FIG. 2 is a front elevation of the implement including the improved toolbar wing lift control.

FIGS. 1 and 2 show an agricultural implement (illustrated here as a planter 102) having a longitudinal major axis 104, a right side 106, and a left side 108. The novel concepts disclosed herein are not restricted to planting implements, however, and may be applied equally well to other articulated apparatus such as, but not limited to, seed drills, plows, harrows, coulters, cultivators, mulchers, etc.

Planter 102 includes a main frame 120 to which is movably affixed a first, or center, section 140. At least one second section, shown as a wing 146, is pivotally secured to center section 140. Center section 140 includes a center frame 142, and wing 146 includes a wing frame 148. As illustrated, planter 102 includes two wings 146: a right wing 146(a), disposed in lateral opposition to a left wing 146(b). In a preferred embodiment, right wing 146(a) is generally a mirror image of left wing 146(b). Each wing includes a pivot end 158 and a free end 156, as well as a wing toolbar 150. Center frame 142 includes a center toolbar 144.

Planter 102 further includes ground support devices, shown as support wheels 124 rotatably mounted to main frame 120, and a tongue 122 for coupling planter 102 to a tractor (not shown) having an engine 110 (shown in FIG. 5) and power transmission apparatus for moving planter 102 about the surface of a field and for supplying mechanical and hydraulic power to planter 102. In an alternative embodiment (not shown), a planter includes an engine and power transmission apparatus and hence is not coupled to a tractor.

Each wing 146 is pivotally mounted to center frame 142 by a pivot 152, having a substantially horizontal pivot axis 154 generally parallel to longitudinal axis 104. In another embodiment (not shown), at least one wing is configured to additionally pivot about a vertical axis in a forward or rearward direction with respect to a center section of an implement.

Main frame 120 includes a hydraulic control circuit 200 configured for control and operation of various actuators, shown generally as hydraulic cylinders. Hydraulic control circuit 200 includes at least a hydraulic pump 202, a hydraulic reservoir shown as a tank 204, and appropriate conduits (e.g., pipes, hoses) 206. In a preferred embodiment, pump 202 is driven through a drive shaft 132 by a power takeoff (PTO) shaft of the tractor.

Figure 5:
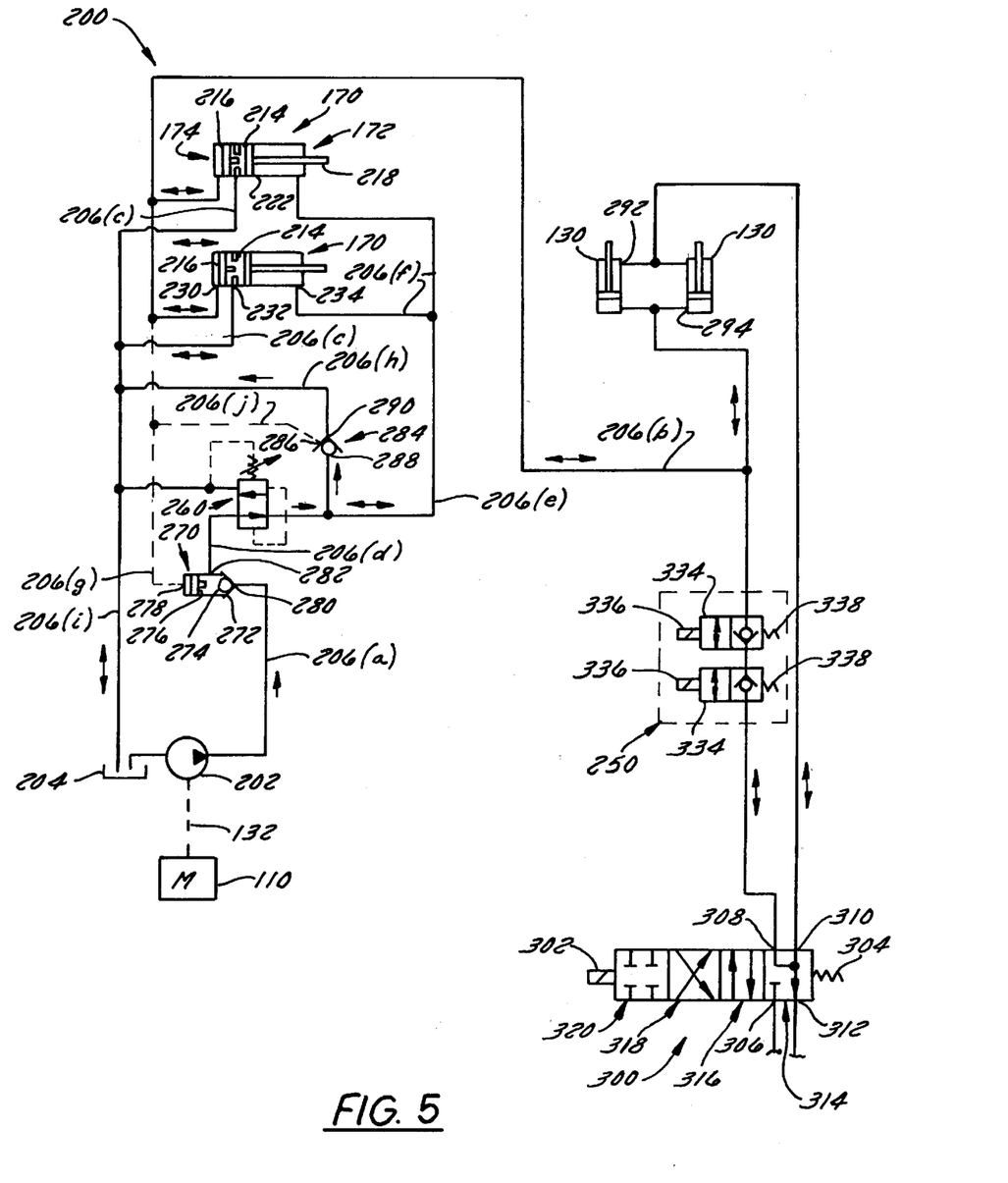
FIG. 5 is a schematic representation of a hydraulic control circuit included within the improved toolbar wing lift control.
Figure 6:
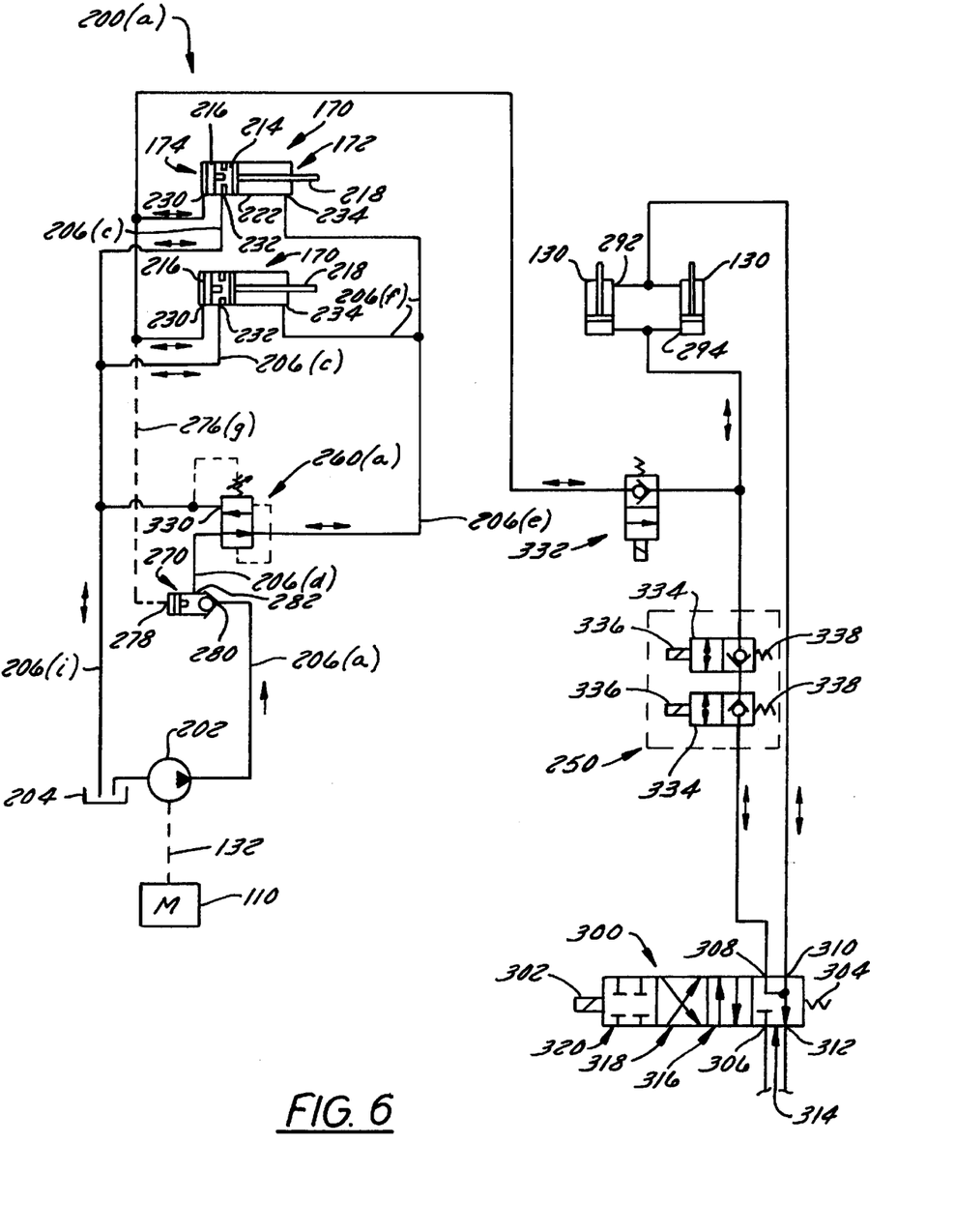
FIG. 6 is a schematic representation of an alternative embodiment of the hydraulic control circuit.

Center section 140 is coupled to main frame 120 by at least one four-bar linkage 126 comprising members 128(a), 128(b), 128(c), and 128(d). Main frame 120 includes at least one hydraulic frame cylinder 130 (more preferably two cylinders 130, as shown in FIGS. 1, 5 and 6) adapted and disposed to articulate linkage 126.

Stroking of frame cylinder 130 with fluid from an auxiliary fluid outlet at the tractor (FIG. 5) through a center section lift valve 250 (FIG. 5) causes center frame 142 to rise with respect to main frame 120 and thereby with respect to the surface of a field or road, while the draining of frame cylinder 130 through lift valve 250 has the opposite effect due to the combined weights of center section 140 and wings 146.

Frame cylinder 130 typically is filled and center section 140 raised not only for transport (e.g., upon roads between fields or field and farmstead) but also each time planter 102 reaches an end of a crop row and enters a turn-around space, or headland, located between the ends of the rows and the adjacent boundaries of the field.

An actuator, shown as a hydraulic wing cylinder 170, is coupled between center frame 142 and each wing frame 148, e.g., by being pinned to the wing frame 148 and center frame 142 by respective couplings 208 and 210, such that it can pivotally raise and lower wing 146 with respect to center section 140. Hydraulic control circuit 200 is disposed in the path of fluid between pump 202 on planter 102 and wing cylinders 170 by at least one appropriate conduit 206(a) (e.g., pipe, tube, and/or hose; shown in FIG. 5) to regulate the flow of hydraulic fluid to and from wing cylinder 170. Hydraulic control circuit 200 is also fluidly coupled to at least one auxiliary hydraulic fluid port of the tractor (not shown) by at least one separate conduit 206(b) (shown in FIG. 5) to provide hydraulic fluid for actuating frame cylinder 130 and other actuators as desired.

Ground engaging tools (here shown as a plurality of seed drills 162) are mounted on a center toolbar 144 and on a wing toolbar 150. Each wing 146 further includes a soil surface contacting device, shown here as a gauge wheel 160, mounted to wing frame 148 in the region of free end 156. In the embodiment of FIG. 1, seed drills 162 therefore define a straight line 164 extending from one side of planter 102 to the other when planter 102 is disposed on a flat surface; e.g., a surface of a field which is flat and without undulations or similar irregularities in the surface of the soil. In other embodiments for other types of implements, such as cultivators, a center section and wings need not include a linear toolbar but can be a two-dimensional array or framework of structural members on which ground engaging tools can be attached in both side to side and forward and aft relationship.

Figure 3:
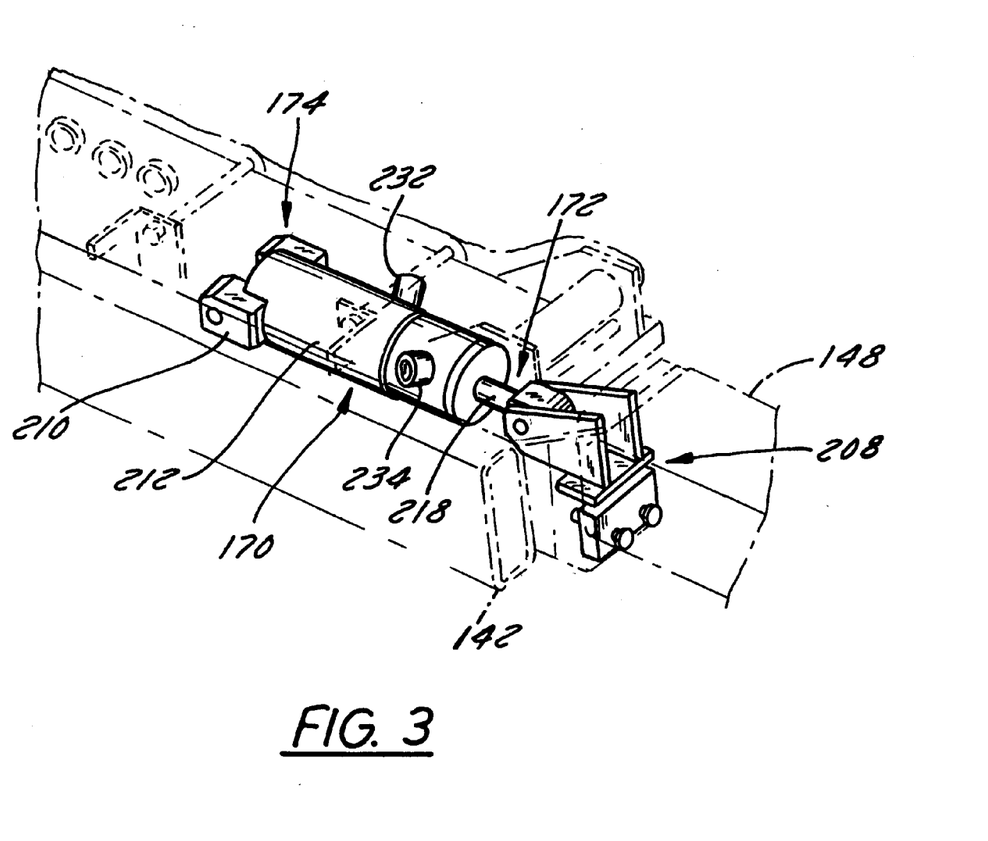
FIG. 3 is a broken-away perspective view of a portion of the improved toolbar wing lift control including a hydraulic cylinder having a plurality of pistons.
Figure 4A:
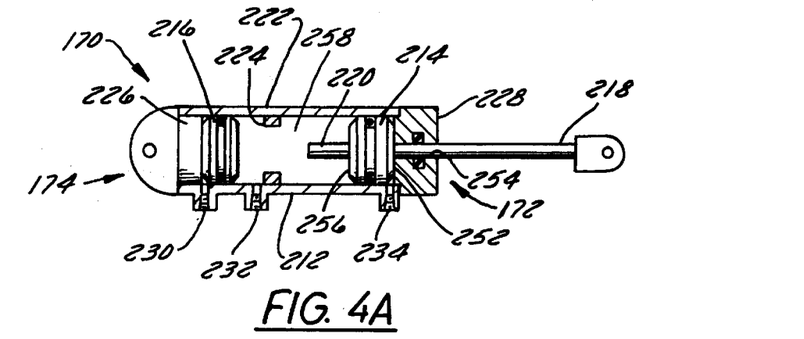
FIGS. 4A–4D are sectional elevations of the hydraulic lift cylinder of FIG. 2 showing disposition of its pistons in various operative conditions.
Figure 4B:
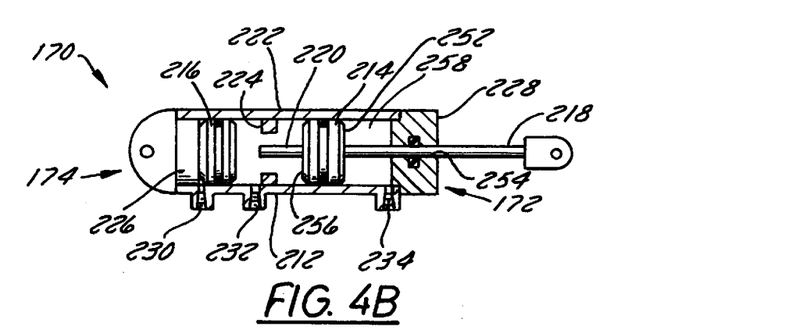
Figure 4C:
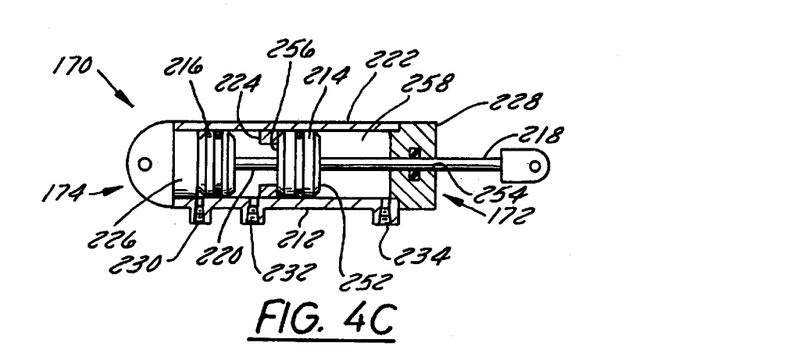
Figure 4D:
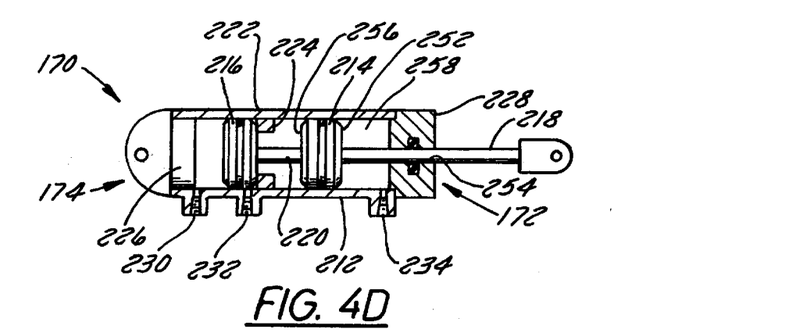

Referring now to FIGS. 1–3, free end 156 of wing 146 can be both raised and lowered with respect to center frame 142; i.e., pivoted about a pivotal coupling 152 by wing cylinder 170. This is described in detail below but, for a brief summary introduction, pivotal coupling 152 allows wing 146 to variably tilt up and down with respect to center section 140 as planter 102 proceeds through a field and gauge wheel 160 causes free end 156 to move in correspondence with undulations or other irregularities in the soil surface; i.e., to "float". Additionally, pressurization of various pistons through various ports in wing cylinder 170 is used to tilt wing 146 upwardly with respect to center section 140 to facilitate traversing headlands when not operatively planting, and also to exert a downwardly disposed force upon wing 146 to facilitate uniform engagement of its seed drills 162 with the soil when operatively planting.

In a preferred embodiment, pivotal coupling 152 is designed to permit free end 156 to raise the wings to a maximum height of 25 degrees (more preferably 20 degrees, and most preferably about 15 degrees) with respect to a transverse major axis (not shown) of center frame 142. It is also designed to permit free end 156 to lower to a maximum depression of 20 degrees (more preferably 18 degrees, and most preferably 15 degrees) with respect to the transverse axis of center frame 142. In this manner, wing 146 has a sufficient range of pivotal movement to permit it to float with respect to the contours of the surface of the soil a field, and also to be raised above the surface when planter 102 is turned around in the headland of a field.

Pivotal coupling 152 is shown as a simple pinned joint or hinge. In an alternative embodiment (not shown), a more complex coupling, such as a multiple bar linkage, is utilized. In any embodiment and to provide sufficient stiffness, more than one pivotal coupling may be provided for each wing.

Hydraulic pump 202 is mounted on main frame 120, and defines, together with hydraulic control circuit 200, wing cylinder 170, and tank 204 a portion of hydraulic control circuit 200 which forces seed drills 162 located near free end 156 of wing 146 into engagement with the soil when operatively planting and lifts free end 156 clear when not operatively planting. Fluid is drawn from tank 204 into pump 202, where it is pressurized and directed through hydraulic control circuit 200 into wing cylinder 170.

FIGS. 4A–4D are separate sectional elevations of wing cylinder 170 showing various dispositions of components for corresponding positions of wing 146. Wing cylinder 170 includes a housing 212 in which a first, or float, piston 214 and a second, or lift, piston 216 are disposed. Float piston 214 is affixed to a rod 218, which extends from a rod-end face 252 of float piston 214 through an opening 254 in a rod end cap 228 of wing cylinder 170. A protuberance, shown as an extension 220 of rod 218, projects from a cap-end face 256 of float piston 214 toward lift piston 216 and toward a cap end cap 226. In an alternative embodiment (not shown), a protuberance may be a projection extending from a rod-end face of a lift piston toward a cap-end face of a float piston. Alternatively, no protuberance may be provided, and the two pistons may be arranged such that they directly abut one another.

Wing cylinder 170 is illustrated as a three-ported cylinder, having a first, or rod-end port, 234; a second, or cap-end, port 230; and a third port positioned intermediate rod-end port 234 and cap-end port 230 and shown as a tank port 232. Cap end port 230 permits fluid to flow into wing cylinder 170 between cap end cap 226 and lift piston 216 in order to move lift piston 216 into abutment with rod extension 220 and thereby move float piston 214 in an extending direction of wing cylinder 170. Lift piston 216 is restrained in its motion by a piston stop (in the illustrated instance, a housing 212 bore step 224), so that fluid flow into wing cylinder 170 through cap end port 230 can extend wing cylinder only a limited amount. This feature is used to pivot wing 146 upwardly five degrees with respect to center section 140 when traversing a headland.

Rod end port 234 permits fluid flow into wing cylinder 170 between rod end cap 228 and float piston 214 in order to exert a contracting force upon wing cylinder 170 and a downwardly disposed force upon free end 156 of wing 146. This has the effect of transferring weight from center section 140 and main frame 120 to free end 156 of wing 146 applying more down force to gauge wheel 160 thereby preventing it from lifting away from the ground and thereby causing the seed drills 162 on wing 146 to maintain a constant depth of penetration as the implement is towed over the ground. In this manner, the engagements of all seed drills 162 with the soil can be substantially equalized in spite of soil surface irregularities.

The apparatus is configured so that the downwardly disposed force can not equal or exceed the combine weights of center section 140 and main frame 120. Gauge wheel 160 prevents the force downwardly disposed upon wing 146 from forcing seed drills 162 too deeply into the soil. Wing 146 therefore floats in correspondence with undulations in the soil surface, and float piston 214 moves correspondingly within housing 212 while maintaining a constant downwardly disposed force upon wing 146.

The downwardly disposed force is applied uniformly in all pivotal positions of wing 146 with respect to center section 140, over the range of plus 5 degrees (i.e., the free end of wing 146 tilted up above horizontal) to minus 5 degrees (i.e., the free end of wing 146 tilted down below horizontal). More preferably over a range of plus or minus 10 degrees, and most preferably over a range of plus or minus 15 degrees. Wing cylinder 170 can extend until facing surfaces of float piston 214 and rod end cap 228 abut each other, at which point wing 146 is tilted ten degrees "up". Wing cylinder 170 can contract until facing surfaces of lift piston 216 and rod 218 abut each other and facing surfaces of lift piston 216 and cap end cap 226 abut each other (i.e., until lift piston 216 is clamped between extension 220 and cap end cap 226), at which point wing 146 is tilted ten degrees "down". When under pressure from cap end port 230, lift piston 216 can extend wing cylinder 170 an intermediate amount by abutting and moving extension 220 until facing surfaces of lift piston 216 and bore step 224 abut each other, at which point wing 146 is tilted five degrees "up".

Tank port 232 penetrates a wall of housing 212 to permit flow of hydraulic fluid into and out of a portion 258 of housing 212 that is disposed between lift piston 216 and float piston 214 and is therefore of variable volume. In a preferred embodiment, this port is connected by an appropriate conduit 206(c) to tank 204 and serves to keep portion 258 of wing cylinder 170 filled with hydraulic fluid, and therefore preclude the admission of dust and moisture-laden ambient air, as well as to gather and return any hydraulic fluid which may eventually leak around either float piston 214 or lift piston 216. In another embodiment (not shown), an intermediately positioned aperture vented to atmosphere, preferably including an air filter, takes the place of a tank port.

Referring now to FIG. 5, a schematic of hydraulic control circuit 200 includes two wing cylinders 170 and two frame cylinders 130 for use in a preferred embodiment of planter 102, although an alternative embodiment (not shown) includes only one of each.

The discussion herein regarding "wing cylinder 170" applies equally to both wing cylinders since both are coupled together in parallel to hydraulic circuit 200 and function identically.

Hydraulic fluid supplied from pump 202 of planter 102 is provided to wing cylinder rod end port 234 through a pressure regulating valve (PRV) 260. PRV 260 may be a direct-acting valve (as shown), or may be of another type; e.g., pilot operated. PRV 260 regulates (i.e., controls to a setpoint, or desired value of pressure for which PRV 260 is configured or to which it has been adjusted, and thereby maintains substantially constant) fluid pressure to wing cylinder rod end port 234 and thereby upon float piston 214 in all positions of float. Wing cylinder 170 thereby exerts a substantially constant retraction force to wing 146, and thereby substantially constant, downwardly disposed force engaging seed drills 162 with the soil. This is used while planter 102 is operatively planting, to maintain substantially constant engagement of seed drills 162 with the soil in spite of soil surface contour irregularities.

In a preferred embodiment, PRV 260 is configured to include an adjustability of its setpoint so that the downwardly disposed force applied to wing 146 can be controllably varied to substantially constant values (e.g., for differing soil conditions, planting depths, crop row spacings, etc.). This may be performed by a manual adjustment (e.g., a screw changing preload of a biasing spring) or a remote adjustment (e.g., by hydraulic pilot pressure or by an electrical or electronic signal). A remote adjustment may in turn be manually controlled by a device (e.g., a potentiometer or a keypad) at an operator's station, or may be automatically geo-referenced to a prescriptive farming GIS database.

A center section lift valve 250 of hydraulic control circuit 200 controls flow of fluid to and from frame cylinder 130, and thereby lifting and lowering of center section 140 with respect to main frame 120. When center section lift valve 250 is opened, fluid flows not only to frame cylinder 130 to lift planter 102 (e.g., for transport or for traversing a headland), but also into a cap end 174 of wing cylinder 170, causing lift piston 216 to shift toward and engage float piston 214, causing float piston 214 to move to its intermediate position when lift piston 216 abuts bore step 224. This, in turn, causes wing 146 to pivot upwardly to its intermediate, lifted position of 5 degrees above center section 140 described above for traversing a headland.

Pressure of hydraulic fluid supplied from pump 202 of planter 102 to wing cylinder rod-end port 234 imposes a contracting force upon wing cylinder 170 and thereby a downwardly disposed force upon wing 146, while pressure of hydraulic fluid from the tractor to wing cylinder cap-end port 230 imposes an extending force upon wing cylinder 170 and thereby an upwardly disposed force upon wing 146. Preferably, these opposing forces are not applied simultaneously.

Accordingly, in the preferred embodiment illustrated in FIG. 5, two check valves 270 and 284 (described below) are provided in hydraulic control circuit 200 to drain, and to prevent pressurization of, a rod end 172 of wing cylinder 170 when pressure is being applied to cap end port 230 to lift wing 146. This enables an operator of planter 102 both to remove the downwardly disposed force upon wing 146 and to lift wing 146 by engaging only one control when reaching the end of a crop row and entering a headland.

PRV 260 is important in the performance of planter 102. When planter 102 is drawn through a field by a tractor over a soil surface, which is less than perfectly flat and planar, a hump or other high spot in the soil pushes upwardly against gauge wheel 160. This has the effect of slightly increasing the downwardly disposed force on wing 146. A corresponding increase in fluid pressure is communicated through a fluid conduit 206(d) to PRV 260, which compensates for the increase of pressure above the setpoint of PRV 260 in the conventional manner by shifting a spool, or other flow modulating element (not shown), to a position in which excess pressure is relieved from rod end port 234 of wing cylinder 170 by permitting fluid to exit port 234 and travel through PRV 260 to tank 204. This increased pressure in the wing cylinders is thereby maintained substantially constant at the setpoint value.

Conversely, if the soil surface drops away from wing 146, the downwardly disposed force applied by wing cylinder 170 to wing 146 is decreased. A corresponding slight decrease in fluid pressure causes the spool of PRV 260 to shift to a position in which valve 260 permits fluid to flow from pump 202 through check valve 270 and through valve 260 into port 234 as rod 218 and piston 216 move left (as shown in FIG. 5). In this manner, pressure in cylinder 170 and hence the down force applied to the wing is again maintained substantially constant by PRV 260 at the setpoint value.

Wings 146 are thereby provided a regulated, substantially constant, downwardly disposed force for uniform engagement of seed drills 162 with the soil in all float positions.

In the preferred embodiment shown in FIG. 5, actuation of center section lift valve 250 applies pressure to wing cylinder cap-end port 230 as well as to a pilot port 278 of an override check valve 270 and to a pilot port 286 of a pilot-operated check valve 284, causing the desired five degree wing lift and depressurization and draining of wing cylinder 170 rod end 172 simultaneous with lifting of center section 140 for turning around at a headland or in preparation for transport.

Override check valve 270 is disposed as shown in the path of fluid from pump 202 to PRV 260. Override check valve 270 is partially of conventional check valve configuration, including a ball 274 and seat 272 allowing free flow in an opening direction and preventing flow in a closing direction, but also includes an override piston 276 which is disposed adjacent ball 274. Override check valve 270 includes a conventional inlet port 280 and outlet port 282, and further includes override piston pilot port 278. Override check valve 270 is configured so that fluid pressure applied at pilot port 278 causes override check valve 270 to close, allowing no flow in either direction.

When planter fluid pressure is applied only to inlet port 280, fluid can flow from pump 202 through override check valve 270 to PRV 260 and onward to wing cylinder rod-end port 234 through conduits 206(e) and 206(f). When, however, tractor fluid pressure is applied to cap-end port 230 of wing cylinder 170, the pressure is also communicated (through a pilot conduit 206(g)) to pilot port 278 of override check valve 270. This pressure shifts override piston 276 against ball 274, driving ball 274 into engagement with seat 272 and thereby closing override check valve 270. This prevents fluid from reaching PRV 260, and hence prevents pressure from being applied to rod end port 234 of wing cylinder 170.

To allow wing cylinder 170 to extend freely and without waste of energy, however, it is necessary not only to prevent application of pressure to rod-end port 234, but also to drain rod end 172 of wing cylinder 170 to tank 204. To this end, pilot-operated check valve 284 is disposed in a conduit 206(h) intermediate wing cylinder rod-end port 234 and a tank return conduit 206(i) in communication with tank 204. Pilot-operated check valve 284 includes an inlet port 288, an outlet port 290, and pilot port 286 in communication with wing cylinder cap-end port 230 through a pilot conduit 206(j). Pilot-operated check valve 284 is configured so that fluid pressure applied at pilot port 286 causes pilot-operated check valve 284 to open, allowing free flow in both directions. When, therefore, pressure is applied to wing cylinder cap end port 230, it is also applied to pilot port 286, causing pilot check valve 284 to open and permit fluid already in rod end 172 of wing cylinder 170 to drain to tank 204.

Thus, when planter 102 reaches a headland and is to cease operation while being turned around to plant the next rows of seed, an operator of planter 102 need only actuate a center section lift control to not only lift center section 140 with respect to main frame 120 but also to remove downwardly disposed force from wing 146 and to lift wing 146 by five degrees with respect to center section 140.

A directional control spool valve 300 is located in the paths of pressurized fluid from the tractor auxiliary fluid valve and of fluid being returned to the tractor fluid reservoir. Directional control valve 300 includes a supply inlet port 306 in communication with a tractor fluid pump (not shown), a supply outlet port 308 in communication with lift valve 250, a return inlet port 310 in communication with a rod end port 292 of frame cylinders 130, and a return outlet port 312 in communication with a tractor fluid reservoir (not shown). Directional control valve 300 is operated by a solenoid 302 and includes a spring return 304 to a default position.

Functions, and corresponding spool positions, of directional control valve 300 include a first position 320 wherein all four ports 306, 308, 310, and 312 are blocked and no flow of fluid may occur in either direction between the tractor and planter 102, wherein the height of center toolbar 144 is fixed with respect to the implement frame and the wings are fixed in position and cannot move up and down in response to changes in ground contours. A second position 316 and a third position 318 may be used to allow flow in a normal, operative direction and in a reverse direction, respectively (e.g., for lifting and lowering of center section 140). A fourth position 314 may be used to drain both supply and return sides of the tractor-supplied portion of hydraulic control circuit 200 back to the tractor reservoir (not shown). The fourth position permits free flow of fluid both to and from the frame cylinders when valve 250 is energized. In this manner, the central frame is permitted to float freely with respect to the implement frame, and is not fixed in position by frame cylinders 130.

In a preferred embodiment, lift control valve 250 is configured as a pair of solenoid-operated, normally-closed valves 334 connected in series as shown in FIG. 5. In the presence of an electrical control signal to a solenoid 336 of each valve 334, both valves 334 open and fluid may flow freely in either direction. In the absence of such a signal, both valves 334 close (e.g., by spring returns 338) and no fluid may flow in either direction.

FIG. 6 shows an alternative embodiment including a hydraulic control circuit 200(a) similar in many respects to hydraulic control circuit 200 described above with reference to FIG. 5.

The alternative embodiment is preferred when back pressure exists in tank return conduit 206(j) in an amount sufficient to prevent a pilot-operated check valve (e.g., pilot-operated check valve 284 of FIG. 5) from closing and therefore to prevent wing cylinder 170 rod end 172 from being sufficiently pressurized to exert a sufficiently large downwardly disposed force upon wing 146 (shown in FIGS. 1 and 2), a check valve is not provided and lift piston 216 of wing cylinder 170 is simply allowed to force float piston 214 with rod 218 outward (i.e., in an extending direction) against the pressure regulated by a pressure regulating valve (PRV) 260(a), which is a pilot-operated PRV having an outlet pressure relieving capability and relief port 330.

It is not necessary to enlarge lift piston 216 or its bore within housing 212 to do this, because the effective pressurized area of the opposing rod-end face of float piston 214 is diminished by the sectional area of rod 218 and its contracting force is therefore less than is the extending force exerted by lift piston 216. Fluid in rod end 172 of wing cylinder 170 is thereby simply forced back to tank 204 through relief port 330. In another alternative embodiment (not shown), a non-relieving PRV 260 (shown in FIG. 5) is provided instead of relieving PRV 260(a), and a pressure relief valve (not shown) is disposed in a conduit 206(h) (shown in FIG. 5). The relief valve is configured, or adjusted, to a setpoint pressure slightly higher than is PRV 260 to preclude inadvertent opening of the relief valve.

In another alternative embodiment, shown in FIG. 6, a solenoid valve 332 is disposed between wing cylinder cap-end port 230 and its supply of hydraulic fluid to permit the wing cylinders to be lowered later than the lift cylinders are lowered.

This staged lowering prevents damage to the wings. Under some circumstances, using the single valve 250 arrangement of FIG. 5 may permit the wings to drop below the central section and engage the ground before the central section. Once the tools on the wings have engaged the ground, the central section drops, and forces the dangling wings outward away from the implement as the wings pivot upward. This may damage the ground engaging tools on the wings as they are forced sideways.

By providing valve 332, the operator can lower the central section until it contacts the ground before lowering the wings. In this situation, the opening of valve 332 is typically delayed until after lift control valve 250 has been opened for a predetermined length of time sufficient to let the seed drills 162 of center section 140 engage the soil. At this time, valve 332 is energized and hydraulic fluid is permitted to drain from port 230 to the reservoir on the tractor through valves 250 and 300. This mode of operation prevents damage to the ground engaging implements on the wings.

In other alternative embodiments (not shown), the hydraulic control circuit may be associated with supply and return conduits of either an implement-mounted hydraulic power unit or a tractor auxiliary hydraulic port, instead of with both as has been described above.

Thus, it is apparent that there has been provided in accordance with the present invention an improved toolbar wing lift and down pressure control that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. An agricultural implement configured to be towed by an agricultural vehicle comprising:
    a first frame having a first plurality of spaced-apart ground engaging tools;
    a second frame having a second plurality of spaced-apart ground engaging tools and pivotally coupled to the first frame;
    a hydraulic cylinder coupled between the first frame and the second frame to pivot the first frame with respect to the second frame about a substantially horizontal axis; and
    a hydraulic control circuit fluidly coupled to the hydraulic cylinder, the hydraulic control circuit 1) including a pressure regulating valve configured to provide a supply of hydraulic fluid under substantially constant pressure from a first source of hydraulic pressure to a first port of the hydraulic cylinder over a range of pivotal positions of the first frame with respect to the second frame in order to apply a down pressure on the first frame relative to the second frame, and 2) being configured to selectively couple a second port of the hydraulic cylinder to a second source of hydraulic pressure to lift the first frame relative to the ground.

2. The agricultural implement of claim 1, further comprising:
    a hydraulic pump configured to be driven by the agricultural vehicle and fluidly coupled to the pressure regulating valve to supply fluid to the first port of the first hydraulic cylinder at a substantially constant pressure.

3. The agricultural implement of claim 1, wherein the hydraulic cylinder is a first hydraulic cylinder, and further comprising a second hydraulic cylinder coupled to the second frame, and wherein the second hydraulic cylinder has a port formed therein which is selectively coupleable to the second source of hydraulic pressure to lift the second frame relative to the ground.

4. An agricultural implement configured to be towed by an agricultural vehicle, comprising:
    a first frame having a first plurality of spaced-apart ground engaging tools;
    a second frame having a second plurality of spaced-apart ground engaging tools and pivotally coupled to the first frame;
    a hydraulic cylinder coupled between the first frame and the second frame to pivot the first frame with respect to the second frame about a substantially horizontal axis;
    a hydraulic control circuit fluidly coupled to the hydraulic cylinder and including a pressure regulating valve configured to provide a supply of hydraulic fluid under substantially constant pressure to a first port of the hydraulic cylinder over a range of pivotal positions of the first frame with respect to the second frame; and
    a hydraulic pump configured to be driven by the agricultural vehicle and fluidly coupled to the pressure regulating valve to supply fluid to the first port of the hydraulic cylinder at a substantially constant pressure, wherein the hydraulic cylinder has a first piston and a first piston rod coupled to the first piston and extending out of the hydraulic cylinder, wherein the first piston and first piston rod are moveable to a fully extended position, a fully retracted position and an intermediate position between the fully extended and fully retracted positions, wherein the fully extended position defines a first frame raised position in which the first frame is pivoted above the second frame, wherein the fully retracted position defines a first frame lowered position in which the first frame is pivoted below the second frame, and wherein the intermediate position defines an intermediate frame position in which the first frame is pivoted above the second frame between the first raised and second lowered positions.

5. The agricultural implement of claim 4, wherein the first port is disposed in the hydraulic cylinder to lower the first frame when the first port is filled with hydraulic fluid, the hydraulic cylinder further including a second piston, and a second port disposed in the cylinder to raise the first frame when the second port is filled with fluid by driving the second piston toward the first piston a distance sufficient to engage the first piston and drive the first piston to the intermediate position.

6. The agricultural implement of claim 5, wherein the hydraulic control circuit further comprises:
    a first check valve disposed between the pump and the pressure regulating valve and responsive to pressure applied to the second port to check hydraulic fluid flow from the pump to the pressure regulating valve.

7. The agricultural implement of claim 6, wherein the hydraulic control circuit further comprises:
    a hydraulic reservoir disposed to supply fluid to an inlet of the hydraulic pump;
    a second check valve disposed in a hydraulic line extending between the first port and the hydraulic reservoir to check hydraulic fluid flow from the first port to the hydraulic reservoir through the hydraulic line.

8. The agricultural implement of claim 7, wherein increasing hydraulic pressure applied to the second port opens the second check valve to permit the flow of hydraulic fluid from the first port to the reservoir and closes the first check valve.

9. The agricultural implement of claim 8, wherein the hydraulic control circuit further comprises a hydraulic supply line couplable to a hydraulic pump on the vehicle to supply hydraulic fluid under pressure to the second port.

10. An agricultural implement, comprising:
    a central frame having a first plurality of spaced-apart ground engaging tools mounted thereon;
    a wing having a second plurality of spaced-apart ground engaging tools mounted thereon and pivotally coupled to the central frame;
    a hydraulic cylinder coupled between the central frame and the wing to pivot the wing with respect to the central frame about a substantially horizontal axis; and a hydraulic control circuit fluidly coupled to the hydraulic cylinder and being configured to be coupled to first and second pumps, the hydraulic control circuit 1) including a pressure regulating valve configured to provide a supply of hydraulic fluid under substantially constant pressure to a first port of the hydraulic cylinder from the first pump over a range of pivotal positions of the wing with respect to the central frame in order to apply a down pressure on the wing relative to the central frame, and 2) being configured to selectively couple a second port of the hydraulic cylinder to the second pump to lift the wing relative to the ground.

11. The agricultural implement of claim 10, further comprising:

a hydraulic pump configured to be driven by the agricultural vehicle and fluidly coupled to the pressure regulating valve to supply fluid to the first port of the first hydraulic cylinder at a substantially constant pressure.

12. The agricultural implement of claim 10, wherein the hydraulic cylinder is a first hydraulic cylinder, and further comprising a second hydraulic cylinder coupled to the central frame, and wherein the second hydraulic cylinder has a port formed therein which is selectively coupleable to the second pump to lift the central frame relative to the ground.

13. An agricultural implement, comprising:

a central frame having a first plurality of spaced-apart ground engaging tools mounted thereon;

a wing having a second plurality of spaced-apart ground engaging tools mounted thereon and pivotally coupled to the central frame;

a hydraulic cylinder coupled between the central frame and the wing to pivot the wing with respect to the central frame about a substantially horizontal axis;

a hydraulic control circuit fluidly coupled to the hydraulic cylinder and including a pressure regulating valve configured to provide a supply of hydraulic fluid under substantially constant pressure to a first port of the hydraulic cylinder over a range of pivotal positions of the wing with respect to the central frame; and a hydraulic pump configured to be driven by the agricultural vehicle and fluidly coupled to the pressure regulating valve to supply fluid to the first port of the hydraulic cylinder at a substantially constant pressure, wherein the hydraulic cylinder has a first piston and a first piston rod coupled to the first piston and extending out of the hydraulic cylinder, wherein the first piston and first piston rod are moveable to a fully extended position, a fully retracted position and an intermediate position between the fully extended and fully retracted positions, wherein the fully extended position defines a wing raised position in which the wing is pivoted above the central frame, and wherein the fully retracted position defines a wing lowered position in which the wing is pivoted below the central frame, and the intermediate position defines an intermediate frame position in which the wing is pivoted above the central frame between the first and second lowered positions.

14. The agricultural implement of claim 13, wherein the first piston port is disposed in the hydraulic cylinder to lower the wing relative to the central frame when the first piston port is filled with hydraulic fluid, wherein the hydraulic cylinder further includes a second piston, and a second piston port disposed in the hydraulic cylinder to raise the wing when the second piston port is filled with hydraulic fluid by driving the second piston toward the first piston a distance sufficient to engage the first piston and drive the first piston to the intermediate position.

15. The agricultural implement of claim 14, wherein the hydraulic control circuit further comprises:

a first check valve disposed between the pump and the first port to check hydraulic fluid flow from the pump through the pressure regulating valve and thence into the first port.

16. The agricultural implement of claim 15, in wherein the hydraulic control circuit further comprises:

a hydraulic reservoir fluidly coupled to the hydraulic pump to supply fluid to the hydraulic pump; and a second check valve disposed between the first port and the hydraulic reservoir to check hydraulic fluid flow from the first port to the hydraulic reservoir, wherein the check valve is responsive to the pressure applied to the second port.

17. The agricultural implement of claim 16, wherein increasing hydraulic pressure applied to the second port opens the second check valve to permit the flow of hydraulic fluid from the first port to the reservoir and closes the first check valve.

18. The agricultural implement of claim 17, wherein the hydraulic control circuit further comprises a hydraulic line coupable to a hydraulic pump on the vehicle to supply hydraulic fluid under pressure to the second port.

19. An agricultural implement configured to be towed by an agricultural implement comprising:

a ground engaging support;

a main frame having a first plurality of spaced-apart ground engaging tools mounted thereon;

a wing having a second plurality of spaced apart ground engaging tools mounted thereon;

a first pump;

a first hydraulic cylinder coupled between the main frame and the wing to pivot the wing with respect to the main frame about a substantially horizontal axis, the first hydraulic cylinder having 1) a first port which is selectively coupleable to the first pump to force the wing to pivot downwardly relative to the main frame to apply down pressure to the wing, and 2) a second port which is selectively coupleable to a second pump to pivot the wing upwardly relative to the main frame; and a second hydraulic cylinder coupled between the main frame and the ground engaging support, the second hydraulic cylinder having a port which is selectively coupleable to the second pump to raise the main frame relative to the ground engaging support.

20. The agricultural implement of claim 19, further comprising a pressure regulating valve configured to provide a supply of hydraulic fluid under substantially constant pressure to the first port of the first hydraulic cylinder from the first pump over a range of pivotal positions of the wing with respect to the main frame.

21. The agricultural implement of claim 19, wherein the first pump is mounted on the agricultural implement.

* * * * *